US011425894B2

(12) United States Patent
Hoffmeister et al.

(10) Patent No.: US 11,425,894 B2
(45) Date of Patent: Aug. 30, 2022

(54) HORSESHOE CRAB INCUBATION SYSTEM

(71) Applicant: ASSOCIATES OF CAPE COD, INCORPORATED, East Falmouth, MA (US)

(72) Inventors: Brett Hoffmeister, Pocasset, MA (US); Samantha Underwood, West Bridgewater, MA (US); Sarah Blick, Plymouth, MA (US)

(73) Assignee: ASSOCIATES OF CAPE COD, INCORPORATED, East Falmouth, MA (US)

( * ) Notice: Subject to any disclaimer, the term of this patent is extended or adjusted under 35 U.S.C. 154(b) by 209 days.

(21) Appl. No.: 16/539,667

(22) Filed: Aug. 13, 2019

(65) Prior Publication Data

US 2020/0053987 A1 Feb. 20, 2020

Related U.S. Application Data

(60) Provisional application No. 62/718,711, filed on Aug. 14, 2018.

(51) Int. Cl.
*A01K 61/51* (2017.01)
*A01K 61/17* (2017.01)
*A01K 63/02* (2006.01)
*A01K 61/50* (2017.01)

(52) U.S. Cl.
CPC .............. *A01K 61/17* (2017.01); *A01K 61/50* (2017.01); *A01K 61/51* (2017.01); *A01K 63/02* (2013.01)

(58) Field of Classification Search
CPC ........ A01K 61/00; A01K 61/50; A01K 61/51; A01K 61/59
USPC .................................................. 119/200, 204
See application file for complete search history.

(56) References Cited

U.S. PATENT DOCUMENTS

| | | | | |
|---|---|---|---|---|
| 3,196,833 A | * | 7/1965 | Glancy ................. | A01K 61/54 119/236 |
| 3,477,406 A | * | 11/1969 | Motosaku ............. | A01K 61/00 119/205 |
| 3,765,372 A | * | 10/1973 | Moe, Jr. ................ | A01K 61/17 119/217 |
| 3,797,458 A | * | 3/1974 | Day ..................... | A01K 61/59 119/209 |

(Continued)

*Primary Examiner* — David J Parsley
(74) *Attorney, Agent, or Firm* — Lando & Anastasi, LLP

(57) ABSTRACT

A method for incubating an aquatic species includes introducing fertilized eggs of the aquatic species into a screened incubation container, introducing the screened incubation container into a vessel of an incubation module, circulating clean oxygenated water through the incubation module vessel, transferring successfully fertilized eggs from the incubation module vessel to an upweller of a hatching module, circulating clean oxygenated water through the upweller, transferring larvae that swim out of the upweller into a tray of a larvae holding module, circulating clean oxygenated water through the larvae holding module, transferring larvae that grow into a juvenile growth stage from the larvae holding module to a tray of a juvenile holding module, circulating clean oxygenated water through the juvenile holding module, and releasing juveniles from the juvenile holding module after a predefined growth period or after the juveniles grow to a predetermined size.

29 Claims, 11 Drawing Sheets

(56) References Cited

U.S. PATENT DOCUMENTS

| | | | | |
|---|---|---|---|---|
| 3,889,639 A * | 6/1975 | Day | .................. | A01K 61/59 |
| | | | | 119/211 |
| 3,916,832 A * | 11/1975 | Sweeney | ............... | A01K 61/85 |
| | | | | 119/212 |
| 4,144,840 A * | 3/1979 | Bubien | ................ | A01K 61/00 |
| | | | | 119/224 |
| 4,394,846 A * | 7/1983 | Roels | .................... | A01K 61/10 |
| | | | | 119/212 |
| 5,353,745 A * | 10/1994 | Fahs, II | ............. | A01K 63/003 |
| | | | | 119/226 |
| 6,382,134 B1 * | 5/2002 | Gruenberg | ............ | A01K 63/04 |
| | | | | 119/215 |
| 6,561,134 B1 * | 5/2003 | Mikami | ............... | A01K 61/59 |
| | | | | 119/204 |
| 7,624,704 B2 * | 12/2009 | Kohlmoos | ............ | A01K 63/06 |
| | | | | 119/269 |

* cited by examiner

HORSESHOE CRAB INCUBATION SYSTEM

CROSS-REFERENCE TO RELATED APPLICATIONS

This application claims priority under 35 U.S.C. § 119(e) to U.S. Provisional Patent application Ser. No. 62/718,711, titled "HORSESHOE CRAB INCUBATION SYSTEM," filed Aug. 14, 2018, which is incorporated herein by reference in its entirety for all purposes.

TECHNICAL FIELD

Aspects and embodiments disclosed herein are generally directed to systems and methods of incubating aquatic lifeforms, in particular, horseshoe crabs.

BACKGROUND

Horseshoe crabs are used for a variety of purposes. The blood of horseshoe crabs includes amebocytes that produce a compound having medically beneficial applications, and thus, various companies capture horseshoe crabs, remove some of the blood from the crabs for processing to recover the amebocytes, and then return the crabs to the wild. Horseshoe crabs may also be used as bait to fish for various other aquatic species, primarily conch. Approximately 750K crabs are harvested for use as bait in the U. S. annually.

The spawning cycle for horseshoe crabs involves female crabs crawling from the ocean onto a beach and digging a hole in which they deposit their eggs. Male horseshoe crabs fertilize the eggs. During the time it takes for the eggs to hatch, many of the eggs may be eaten by shore birds. Human manipulation of the shoreline can also negatively impact the suitability of suitable habitat for spawning.

SUMMARY

In accordance with an aspect disclosed herein there is provided a method of incubating an aquatic species. The method comprises introducing fertilized eggs of the aquatic species into a screened incubation container, introducing the screened incubation container into a vessel of an incubation module, circulating clean oxygenated water through the incubation module vessel, transferring successfully fertilized eggs from the incubation module vessel to an upweller of a hatching module, circulating clean oxygenated water through the upweller, transferring larvae that swim out of the upweller into a tray of a larvae holding module, circulating clean oxygenated water through the larvae holding module, transferring larvae that grow into a juvenile growth stage from the larvae holding module to a tray of a juvenile holding module, circulating clean oxygenated water through the juvenile holding module, and releasing juveniles from the juvenile holding module after a predefined growth period or after the juveniles grow to a predetermined size.

In some embodiments, transferring the larvae that grow into the juvenile growth stage from the larvae holding module to the tray of the juvenile holding module comprises capturing all larvae and juveniles in the tray of the larvae holding module with a fine mesh net, placing the captured larvae and juveniles onto a screen including apertures larger than apertures in the fine mesh net, causing the majority of the larvae to pass through the apertures of the screen and retaining the juveniles on the screen by running clean water over the larvae and juveniles, returning the larvae that pass through the apertures of the screen to the tray of the larvae holding module, and placing the juveniles retained on the screen in the tray of the juvenile holding module.

In some embodiments, the method further comprises treating the water circulated through one or more of the incubation module vessel, the upweller, the larvae holding module, or the juvenile holding module with ultraviolet light.

In some embodiments, the method further comprises collecting eggs and sperm from live adults of the aquatic species, combining the eggs and sperm, and transferring the eggs and sperm to the screened incubation container.

In some embodiments, the method is performed year-round.

In some embodiments, a decision to transfer the aquatic species from one module to a next module is made based on visual observations of a state of growth of the aquatic species.

In accordance with another aspect, there is provided system for incubating an aquatic species. The system comprises an incubation module including a vessel, a screened incubation container removably disposed in the vessel, and a water pump configured to circulate water through the incubation module, a hatching module for receiving viable eggs from the incubation module and including an upweller and a water pump configured to circulate water through the hatching module, a larvae holding module for receiving larvae from the hatching module and including a water pump configured to circulate water through the larvae holding module, and a juvenile holding module for receiving juveniles from the larvae holding module and including a water pump configured to circulate water through the juvenile holding module.

In some embodiments, the larvae holding module includes at least one tray having a screened outlet. The at least one tray may be configured to hold up to 5,000 larvae, allowing room for movement of the larvae in the at least one tray.

In some embodiments, the juvenile holding module includes at least one tray having a screened outlet. The at least one tray may be configured to hold up to 2,500 juveniles, allowing room for movement of the juveniles in the at least one tray.

In some embodiments, the system further comprises one or more ultraviolet light dosing chambers in which water circulated through a respective one or more of the incubation module, hatching module, larvae holding module, or juvenile holding module is treated with ultraviolet light.

In some embodiments, the system further comprises one or more air pumps configured to deliver air to water circulated through a respective one or more of the incubation module, hatching module, larvae holding module, or juvenile holding module.

In some embodiments, each of the incubation module, hatching module, larvae holding module, and juvenile holding module has an associated dedicated re-circulating saltwater tank configured to provide saltwater to each respective module.

In some embodiments, the screened incubation container includes a mesh bag. The screened incubation container may be configured to hold up to 2,000 grams of the fertilized eggs, while providing for movement of the eggs within the screened incubation container.

In some embodiments, the upweller includes a cover with an aperture that creates a back pressure in the upweller that helps the larvae move upward and out of the upweller. The aperture in the cover of the upweller may be fluidly connected to a sump including a screen configured to capture larvae that exit the upweller. Water may be recirculated from the sump through the upweller. The system may comprise a plurality of upwellers in fluid communication in parallel with the sump.

In some embodiments, a capacity of the system may be increased by adding additional modules.

In accordance with another embodiment, there is provided a system for incubating an aquatic species. The system comprises an incubation module including a vessel, a water-permeable incubation container configured to retain fertilized eggs of the aquatic species removably disposed in the vessel, a water pump configured to circulate water through the incubation module and water-permeable incubation container, a filter and ultraviolet light disinfection system disposed in a fluid flow path of the water, and a source of an oxygen-containing gas configured to deliver the oxygen-containing gas to water in the vessel.

In some embodiments, the filter and ultraviolet light disinfection system are included in the water pump.

In some embodiments, the water-permeable incubation container comprises a mesh bag. The water-permeable incubation container may be configured to hold up to 2,000 grams of the eggs, while providing for movement of the eggs within the water-permeable incubation container. The vessel may be configured to hold up to four of the water-permeable incubation containers.

In some embodiments, the system further comprises a dedicated re-circulating saltwater tank configured to provide saltwater to the vessel. The dedicated re-circulating saltwater tank may be fluidly coupled to a filter and ultraviolet light disinfection system configured to treat saltwater from the saltwater tank and return the treated saltwater to the saltwater tank.

In some embodiments, the incubation module is configured to perform a process including providing oxygen to the fertilized eggs and preventing the fertilized eggs from becoming compacted by circulating seawater through the vessel, oxygenating the seawater circulated through the vessel, disinfecting the seawater circulated through the vessel, and washing dead sperm and other debris from the fertilized eggs.

In accordance with another embodiment, there is provided system for incubating an aquatic species. The system comprises a hatching module including one or more upwellers, each of the one or more upwellers including a cover with an aperture configured to create a back pressure in seawater circulating through the one or more upwellers that helps larvae move upward and out of the upweller, a manifold configured to deliver seawater into each of the one or more upwellers, a sump in fluid communication with the apertures in the covers of the one or more upwellers and configured to receive seawater and larvae exiting from the apertures in the covers of the one or more upwellers, a straining screen disposed in the sump and configured to capture larvae that have exited from the apertures in the covers of the one or more upwellers, a recirculating pump in fluid communication downstream of the sump and configured to pump seawater from the sump to the manifold, and a filter and ultraviolet light disinfection system disposed in a fluid flow path of the seawater.

In some embodiments, wherein the filter and ultraviolet light disinfection system are included in the recirculating pump.

In some embodiments, the system further comprises a dedicated re-circulating saltwater tank configured to provide saltwater to the hatching module. The dedicated re-circulating saltwater tank may be fluidly coupled to a filter and ultraviolet light disinfection system configured to treat saltwater from the saltwater tank and return the treated saltwater to the saltwater tank.

In some embodiments, the hatching module is configured to perform a process comprising retaining fertilized eggs of the aquatic species in the one or more upwellers, moving the fertilized eggs within the one or more upwellers by circulating seawater through the one or more upwellers from the manifold into the sump, disinfecting and oxygenating the seawater circulated through the one or more upwellers, maintaining a backpressure of the circulating seawater in the one or more upwellers, and capturing larvae that hatch from the fertilized eggs and swim out of the one of more upwellers.

In accordance with another aspect, there is provided a system for incubating an aquatic species. The system comprises a larvae holding module including one or more trays configured to retain larvae of the aquatic species, each of the one or more trays including a screened outlet having a screen size sufficiently small to prevent the larvae from passing through the screened outlet, a distribution manifold configured to supply seawater to each of the one or more trays, a sump positioned downstream of the one or more trays and configured to receive seawater draining from the one or more trays through the screened outlets, a supply of oxygen-containing gas configured to deliver oxygen to seawater in the sump, a recirculating pump in fluid communication downstream of the sump configured to pump seawater from the sump to the distribution manifold, and a filter and ultraviolet light disinfection system disposed in a fluid flow path of the seawater.

In some embodiments, the filter and ultraviolet light disinfection system are included in the recirculating pump.

In some embodiments, the system further comprises a dedicated re-circulating saltwater tank configured to provide saltwater to the larvae holding module and to a juvenile holding module. The dedicated re-circulating saltwater tank may be fluidly coupled to a filter and ultraviolet light disinfection system configured to treat saltwater from the saltwater tank and return the treated saltwater to the saltwater tank. The one or more trays may be fluidically coupled in series. The one or more trays may be fluidically coupled in parallel. The one or more trays may be in fluid communication upstream of a juvenile holding module. The larvae holding module and the juvenile holding module may share the sump, the supply of oxygen-containing gas, and the recirculating pump. Each of the one or more trays may be sized to contain up to 5,000 larvae, allowing for movement of the larvae within the one or more trays.

In some embodiments, the system of is configured to perform a process comprising retaining the larvae in the one or more trays until the larvae molt, circulating seawater through the one or more trays, and filtering and disinfecting the seawater circulated through the one or more trays.

In accordance with another aspect, there is provided a system for incubating an aquatic species. The system comprises a juvenile holding module including one or more trays configured to retain juveniles of the aquatic species, each of the one or more trays including a screened outlet having a screen size sufficiently small to prevent the juveniles from passing through the screened outlet, a distribution manifold configured to supply seawater to each of the one or more trays, a sump positioned downstream of the one or more trays and configured to receive seawater draining from the one or more trays through the screened outlets, a supply of oxygen-containing gas configured to deliver oxygen to seawater in the sump, a recirculating pump in fluid communication downstream of the sump configured to pump seawater from the sump to the distribution manifold, and a filter and ultraviolet light disinfection system disposed in a fluid flow path of the seawater.

In some embodiments, the filter and ultraviolet light disinfection system are included in the recirculating pump.

In some embodiments, the system further comprises a dedicated re-circulating saltwater tank configured to provide saltwater to the juvenile holding module and to a larvae holding module. The dedicated re-circulating saltwater tank may be fluidly coupled to a filter and ultraviolet light disinfection system configured to treat saltwater from the saltwater tank and return the treated saltwater to the saltwater tank.

In some embodiments, the one or more trays are fluidically coupled in series.

In some embodiments, the one or more trays are fluidically coupled in parallel.

In some embodiments, the one or more trays are in fluid communication downstream of a juvenile holding module. The larvae holding module and the juvenile holding module may share the sump, the supply of oxygen-containing gas, and the recirculating pump.

In some embodiments, each of the one or more trays is sized to contain up to 2,500 juveniles, allowing for movement of the juveniles within the one or more trays.

In some embodiments, the system is configured to perform a process comprising retaining the juveniles in the one or more trays until the juveniles grow to a predetermined size, circulating seawater through the one or more trays, and filtering and disinfecting the seawater circulated through the one or more trays.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1A:
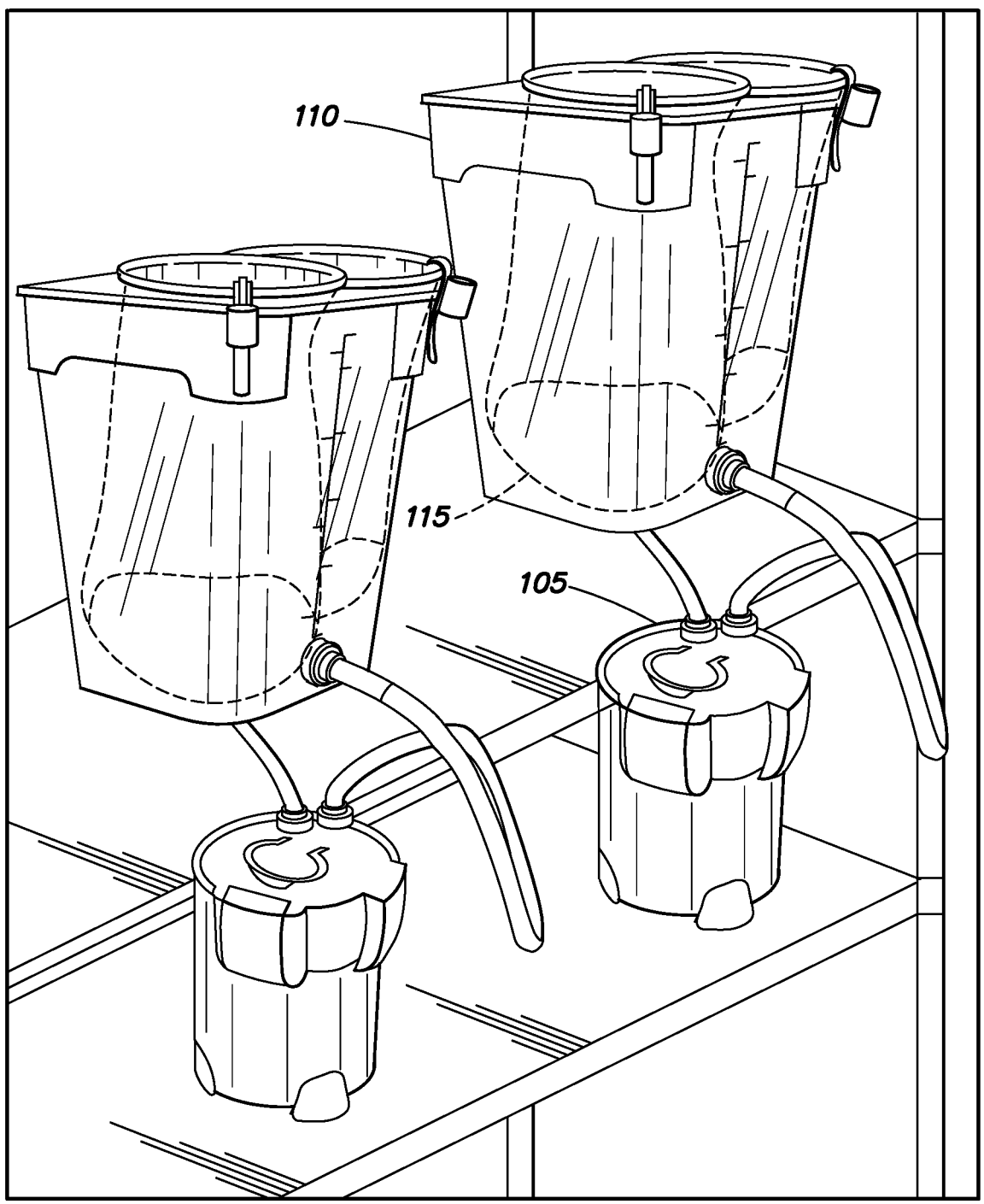
FIG. 1A illustrates an example of an egg incubation module of an incubation system.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

In areas in which horseshoe crab populations are fished for bait, in decline or lower than desired, it may be beneficial to breed the crabs in captivity so that a greater number of eggs hatch and to protect hatched larvae from predators until they mature into juveniles.

Aspects and embodiments disclosed herein include a compartmentalized modular system for incubating and hatching horseshoe crab eggs, then raising the horseshoe crabs until they are released into the wild for enhancement of the wild horseshoe crab population and methods of operating same. One embodiment of a compartmentalized horseshoe crab incubation system may include four basic modules.

Figure 1B:
FIG. 1B illustrates a mesh strainer bag that may be utilized to hold eggs in the egg incubation module.
Figure 1C:
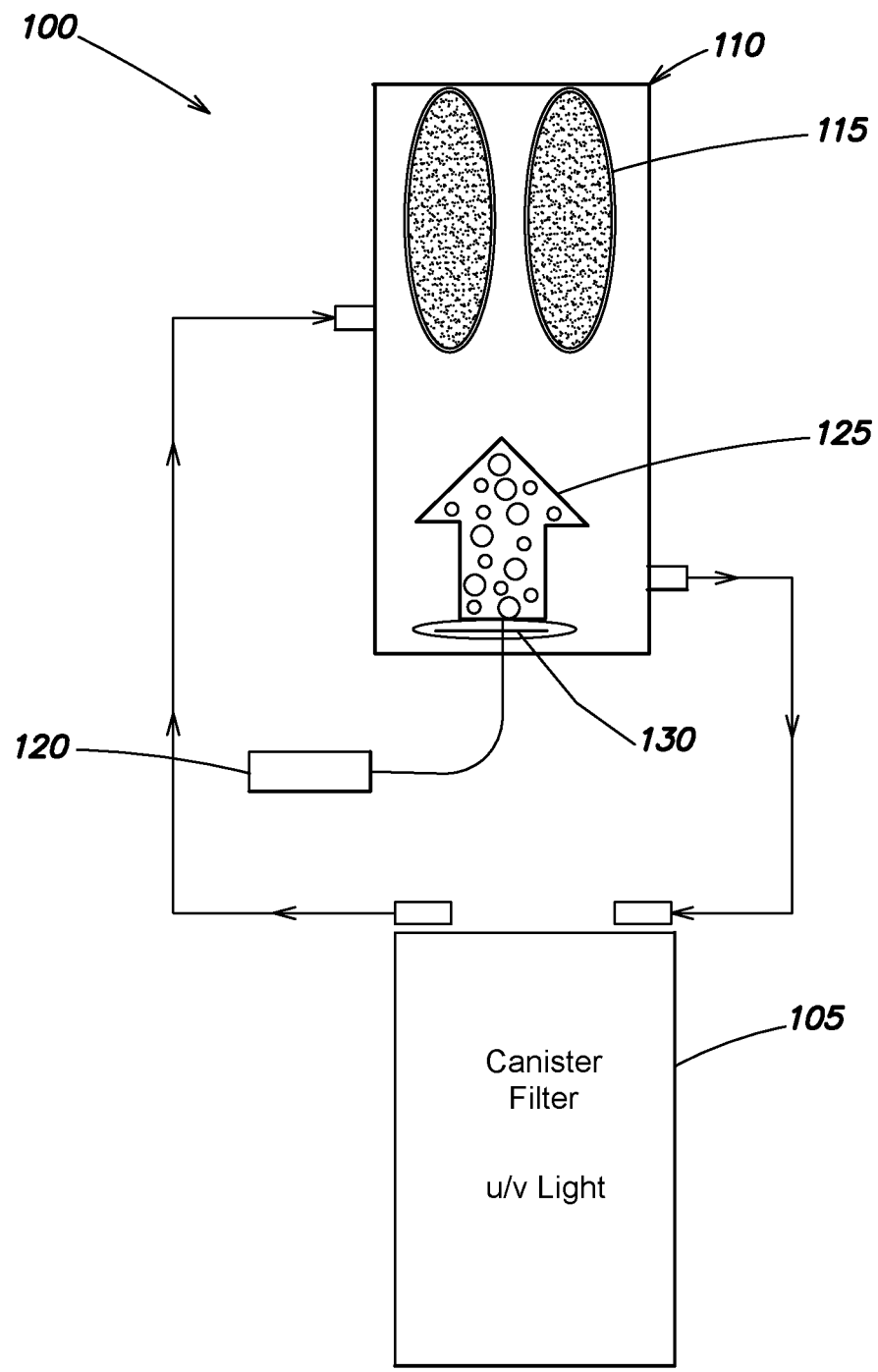
FIG. 1C is a diagram of the incubation module of FIG. 1A.

A first of the four basic modules is an incubation module. An incubation module may include one or more screened incubation bags or trays housed in a vessel of seawater which is oxygenated, sanitized, filtered, and recirculated by a pump. As the terms are used herein, "seawater" or simply "water" may include seawater obtained from an ocean, synthetic seawater, saltwater, or combinations of these types of water. An illustration of an example of an incubation module is provided in FIG. 1A, wherein the pump is indicated at 105 and the vessel is indicated at 110. An example of an incubation bag 115 for holding the fertilized eggs within the container 110 is illustrated in FIG. 1B. A schematic diagram of the incubation module 100 is shown in FIG. 1C.

The pump 105 may include an ultraviolet light disinfection module that may irradiate the circulating seawater with ultraviolet light, which helps mitigate possible bacterial or fungal growth in the recirculating seawater, which could harm the eggs. The seawater flows through the vessel 110 to provide clean oxygenated water to fertilized crab eggs in a manner which prevents the eggs from becoming compacted (e.g., to maintain the eggs in a fluidized state) and oxygen starved. The screened incubation bag(s) 115 include a mesh that allows for dead sperm and other material to be washed away from the eggs and trapped in a filter. An electric air pump 120 may provide air 125 to the water in the vessel 110 through an air bubbler 130, for example, an air stone. When fertilized eggs are present and enlarging they can be sifted and held in the hatching module.

To obtain the eggs for introduction into the incubation module, live adult horseshoe crabs are captured, and eggs and sperm are collected from the horseshoe crabs before they are returned to the wild. The collected eggs and sperm are combined and allowed to sit for an hour or more. They are then drained and washed with clean salt water and transferred to a mesh bag and placed in the incubation module. A bag can hold up to 2,000 grams of eggs loosely, although in other embodiments, differently sized bags may be utilized that accommodate a greater or lesser amount of eggs. Each tank in the incubation module can hold 3-4 bags. A user can determine how many eggs to put in a bag. For example, in the spring when the crabs express large amounts of eggs 2,000 grams could be one or two days collection. During summer months the crabs may express fewer eggs, for example, about 300 grams per day. Eggs that fertilize successfully will grow larger and can be sorted and placed in a hatching module. This takes 2-4 weeks generally and progress in a bell curve. When the bulk of the eggs stop growing into larger ones, the remaining bulk may be discarded. In some embodiments, roughly 80% of the eggs do not progress and are discarded. After removing the eggs from the mesh bags, the mesh bags may be discarded and replaced or washed before placing new eggs in them.

Figure 2A:
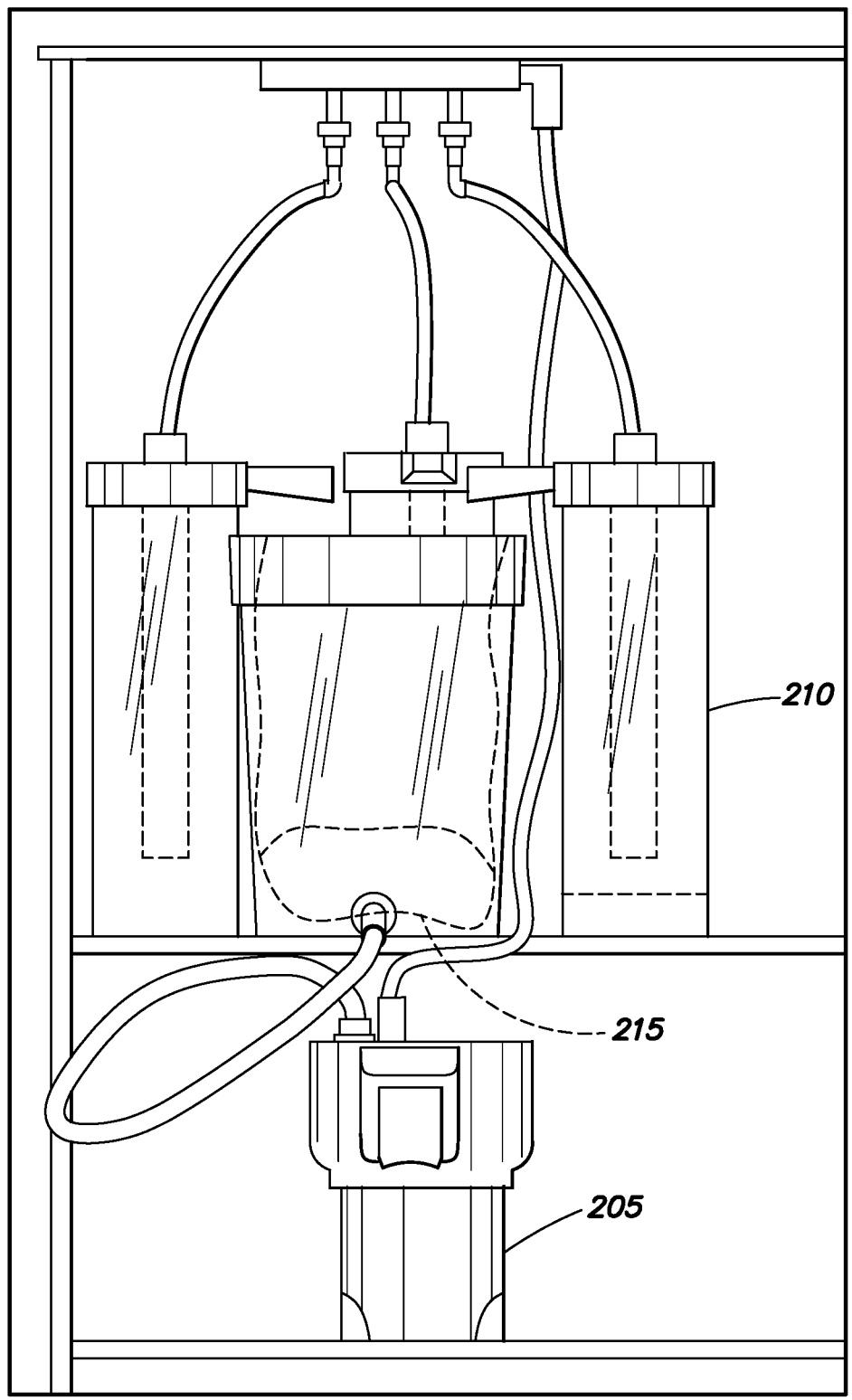
FIG. 2A illustrates an example of a hatching module of an incubation system.

The second of the four basic modules is a hatching module. A hatching module may include a system of commercially available upwellers that are modified to include a covered top with a V-shaped notch acting as release point to a spout, one or more pumps for circulating water through the upwellers, and a straining basket for capturing hatched larvae. An illustration of an example hatching module is provided in FIG. 2A, wherein a pump is indicated at 205, one of the upwellers is indicated at 210, and the straining basket is indicated at 215 within a sump 240. A diagram of the hatching module 200 is provided in FIG. 2B.

Figure 2B:
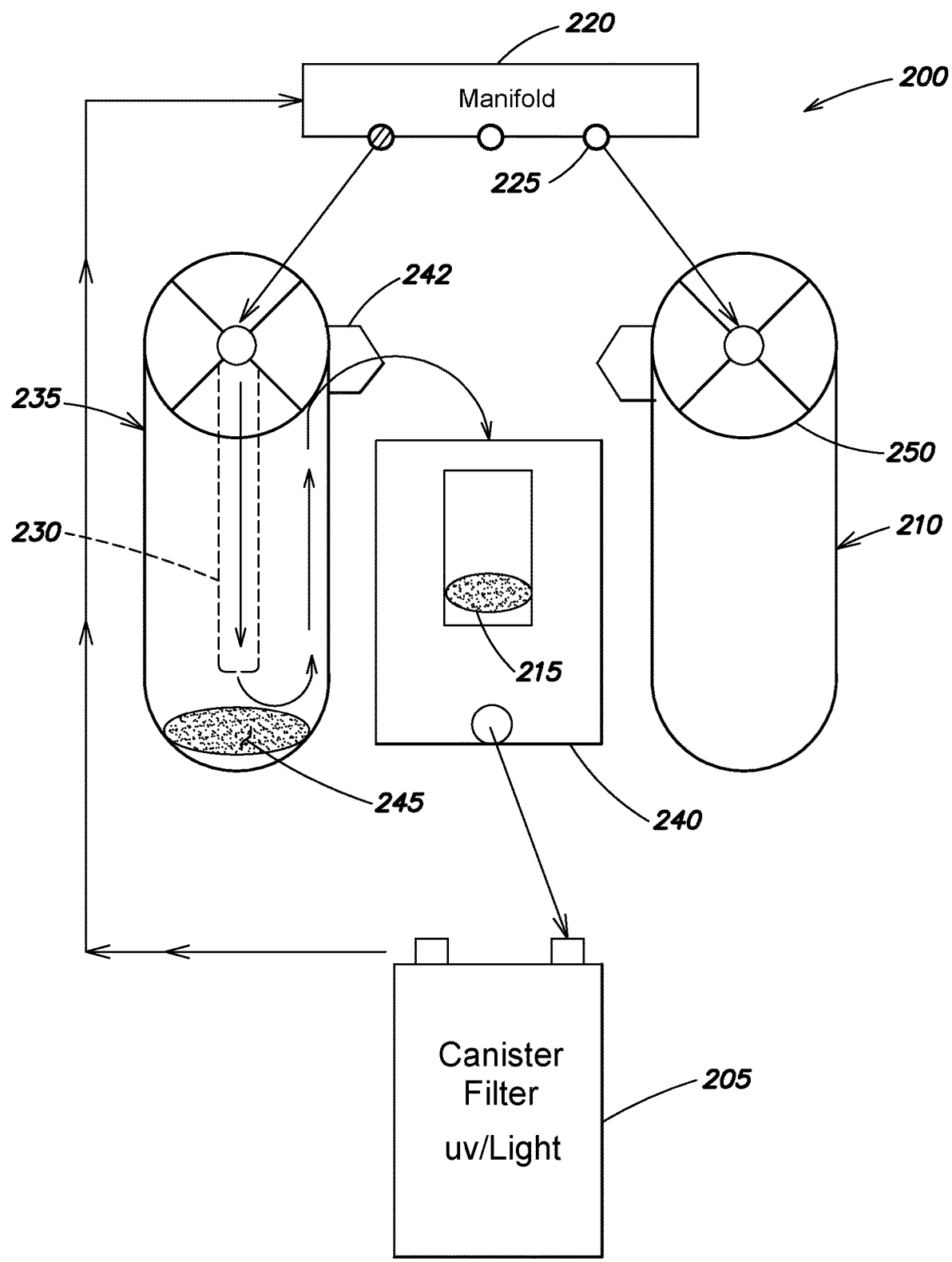
FIG. 2B is a schematic diagram of the hatching module of FIG. 2A.

In the upwellers 210 water is distributed downward from a manifold 220 including flow control valves 225 into a tube 230 which is seated in a large cylinder 235. The water flows down and eventually out through the spout 242 at the top of the large cylinder 235. The upwellers are filled by recirculating water pumps 205 (only one shown in FIG. 2B) which supply clean, sanitized, oxygenated seawater. The pumps 205 may include ultraviolet light disinfection modules that may irradiate the circulating seawater with ultraviolet light, which helps mitigate possible bacterial or fungal growth in the recirculating seawater, which could harm the eggs or larvae. Water to the pumps is supplied by a sump 240 which may hold the straining basket 215. Eggs 245 that are placed in the upwellers 210 will be kept in a gentle motion by the water flow. Larvae will hatch from the enlarged eggs and swim upward with the flow of the water. The covers 250 on the top of the upwellers create a back pressure which helps the larvae move upward, while keeping the fertilized eggs from escaping the upwellers, as the open V-notch in the covers allow for larvae to swim out 24/7. The larvae that exit the upwellers 210 at the spouts 242 are captured in a screened straining basket 215 placed in the sump 240 suppling water to the system. Three or four upwellers 210 can be run simultaneously through the use of a manifold 220 that supplies water to each upweller 210, although through use of the control valves 225 water flow may be turned on or off to connected upwellers 210. In FIG. 2B, for example, water flow is turned on to the left side upweller but turned off for the right side upweller. Larvae that are caught in the straining basket 215 are transferred to a larvae holding module on a daily basis.

Similar to the incubation module, the hatching modules exhibit a bell curve of hatching activity. After the eggs hatch, what remains are dead eggs, dead crabs, egg shells, and maybe a few unhatched larvae, all of which may be discarded.

The third of the basic modules is a larvae holding module. The larvae holding module includes a number of shallow trays that are filled on one end by a distribution manifold fed by a sanitizing filter and pump. The opposite end of the tray includes a screened drain. The trays can be used in sequence, for example, a topmost tray may drain to a second tray below it and the second tray may drain to a third tray below the second tray. The last tray in sequence will drain to a sump which supplies the water to the sanitizing pump. An air pump may be utilized to bubble air through the water in the sump to add oxygen to the water. Larvae will stay in the trays of the larvae holding module until they molt into their first juvenile instar stage at which point they can be sorted and moved to the juvenile holding module. When molting, the larvae shed their outer shell and emerge roughly 20% bigger. The larger molted larvae, considered juveniles, are distinguishable from the smaller larvae. To separate the juveniles from the un-molted larvae, all the juveniles and larvae are caught in a tray with a fine mesh net. Once collected, the juveniles and larvae are placed onto a screen with larger holes in it. Clean water is run over the juveniles and most of the larvae will fall through leaving behind the larger juveniles on the screen. The juveniles can then be placed in their own tray in a juvenile holding module.

Figure 3A:
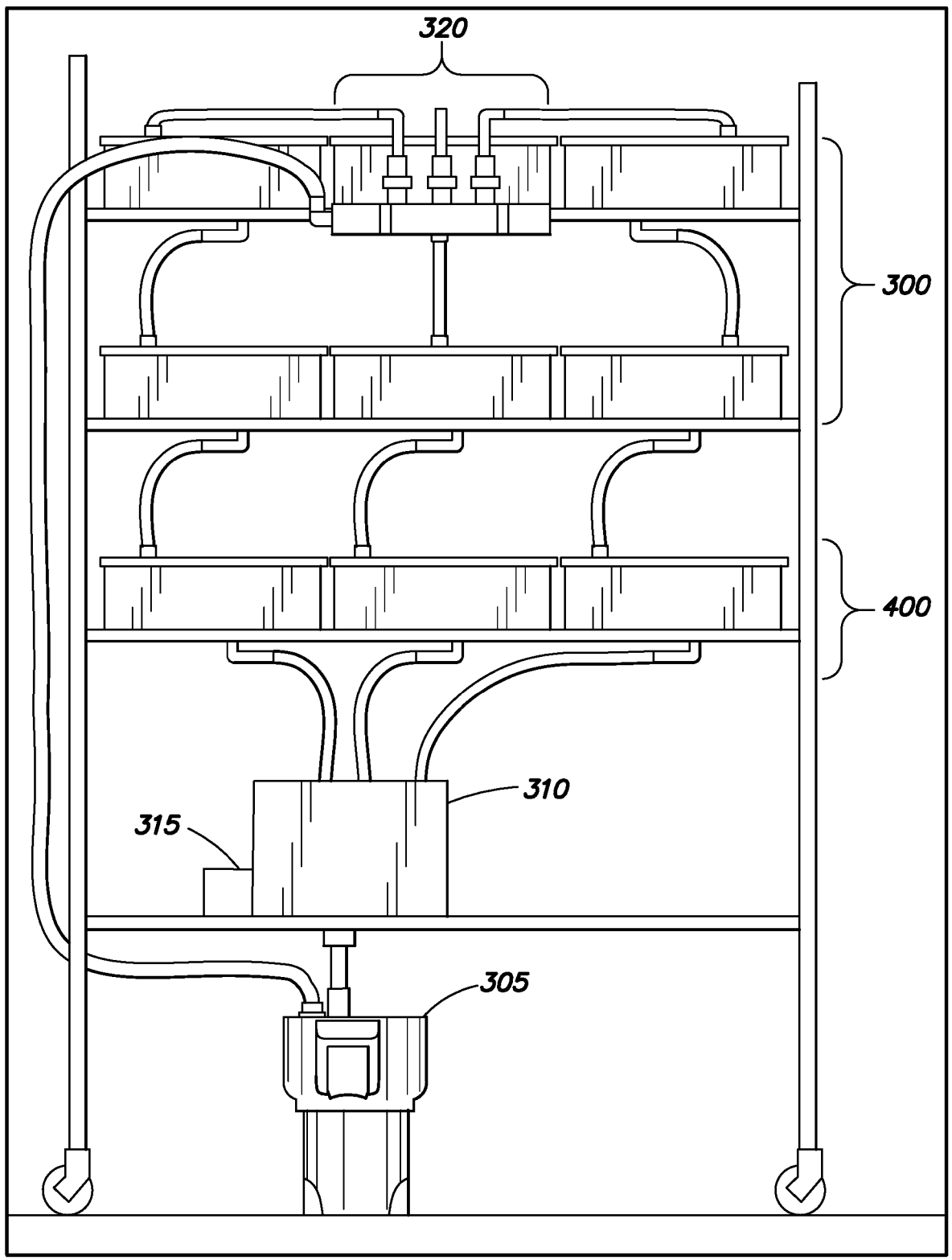
FIG. 3A illustrates a larvae hatching and holding module of an incubation system.
Figure 3B:
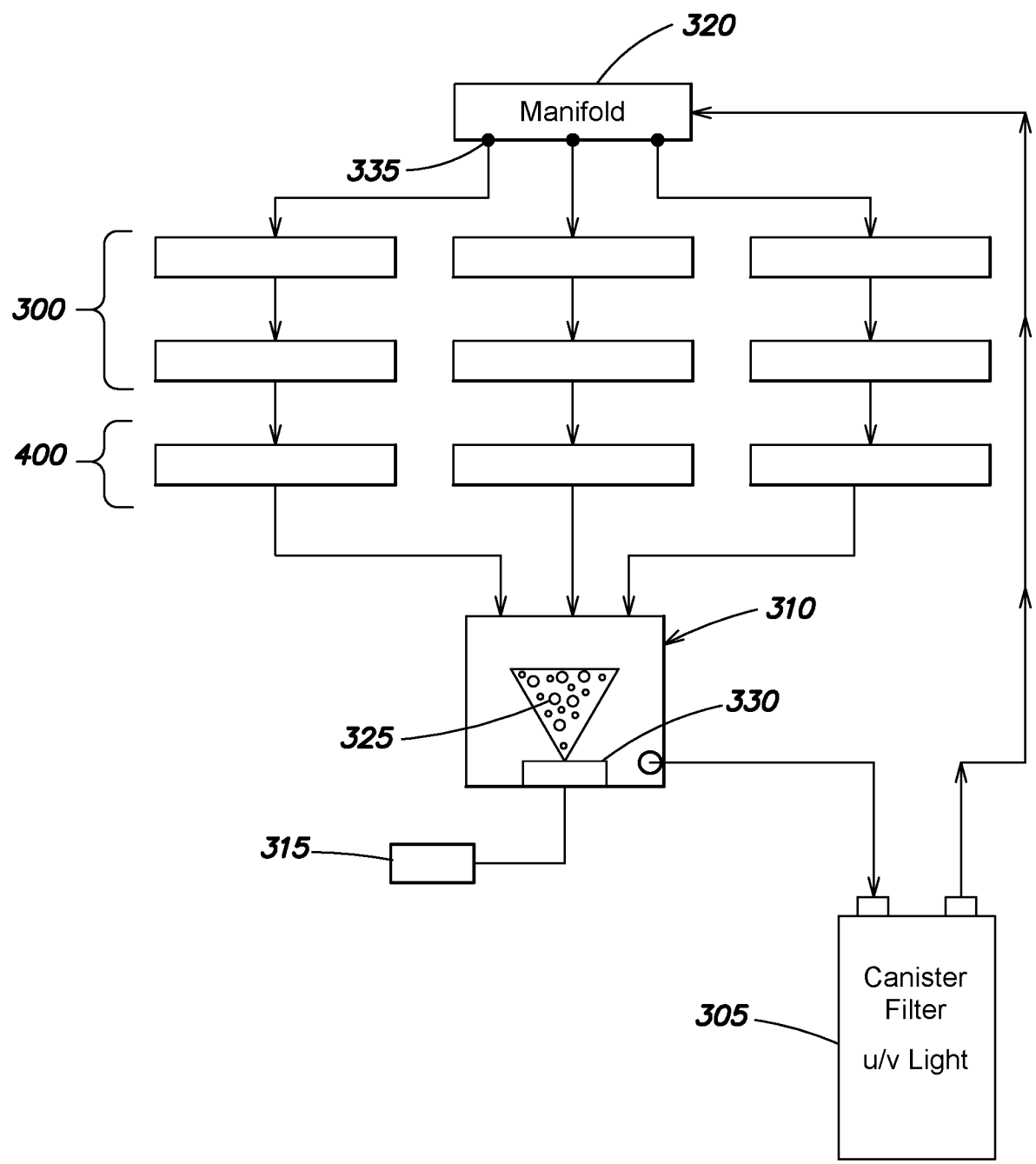
FIG. 3B is a schematic diagram of the larvae hatching and holding module of FIG. 3A.
Figure 3C:
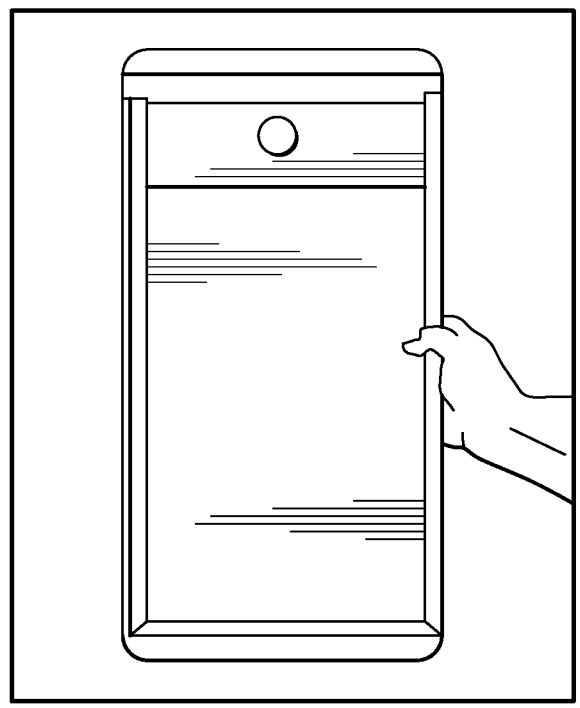
FIG. 3C illustrates an individual tray used in the larvae holding modules and juvenile holding modules of FIG. 3A.
Figure 3D:
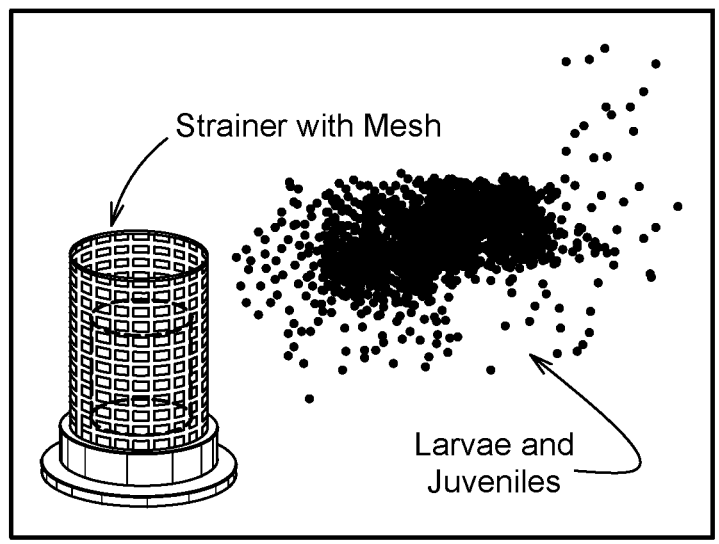
FIG. 3D illustrates a screened drain that may be used in the trays of the larvae holding module and/or juvenile holding module.

The fourth of the four basic modules is a juvenile holding module. The juvenile holding module may be identical to the larvae holding module except that the number of crabs per tray is kept at approximately 3000 or less to prevent density problems. An illustration of an example larvae holding module and juvenile holding module is provided in FIG. 3A and a schematic diagram of same is provided in FIG. 3B. The larvae holding module and juvenile holding module may share a common pump 305, sump 310, and air pump 315. The air pump 315 may be an electric air pump that provides air 325 to the water in the sump 310 through an air bubbler 330, for example, an air stone. The distribution manifold of the larvae holding module is indicated at 320 and includes flow control valves 335. The larvae holding module may include the upper trays 300 and the juvenile holding module may include the lower trays 400. An individual tray that may be used in the larvae holding module and/or juvenile holding module is illustrated in FIG. 3C. An example of a screened drain that may be used in the trays of the larvae holding module and/or juvenile holding module is illustrated in FIG. 3D. Juvenile crabs grow in the juvenile holding module until being released into the wild. Foods such as freeze dried brine shrimp may be provided to the larvae or juveniles in the larvae or juvenile holding modules. A typical tray may contain roughly 5,000 larvae or 2,500 juveniles, allowing room for movement, although in other embodiments, trays may be sized to hold a greater or lesser number of larvae or juveniles.

Figure 5A:
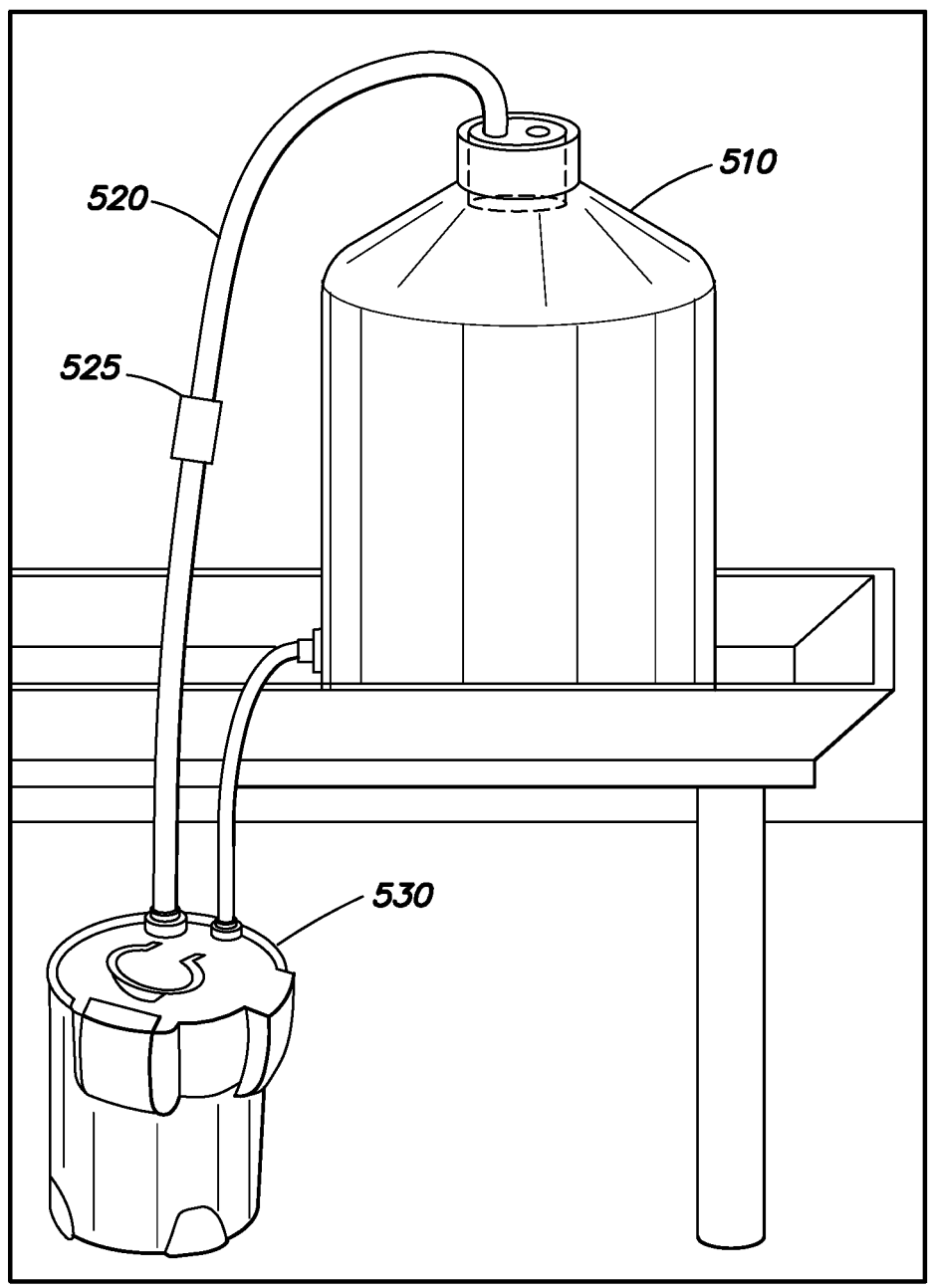
FIG. 5A illustrates a recirculating water supply tank for providing water to a module of the system.
Figure 5B:
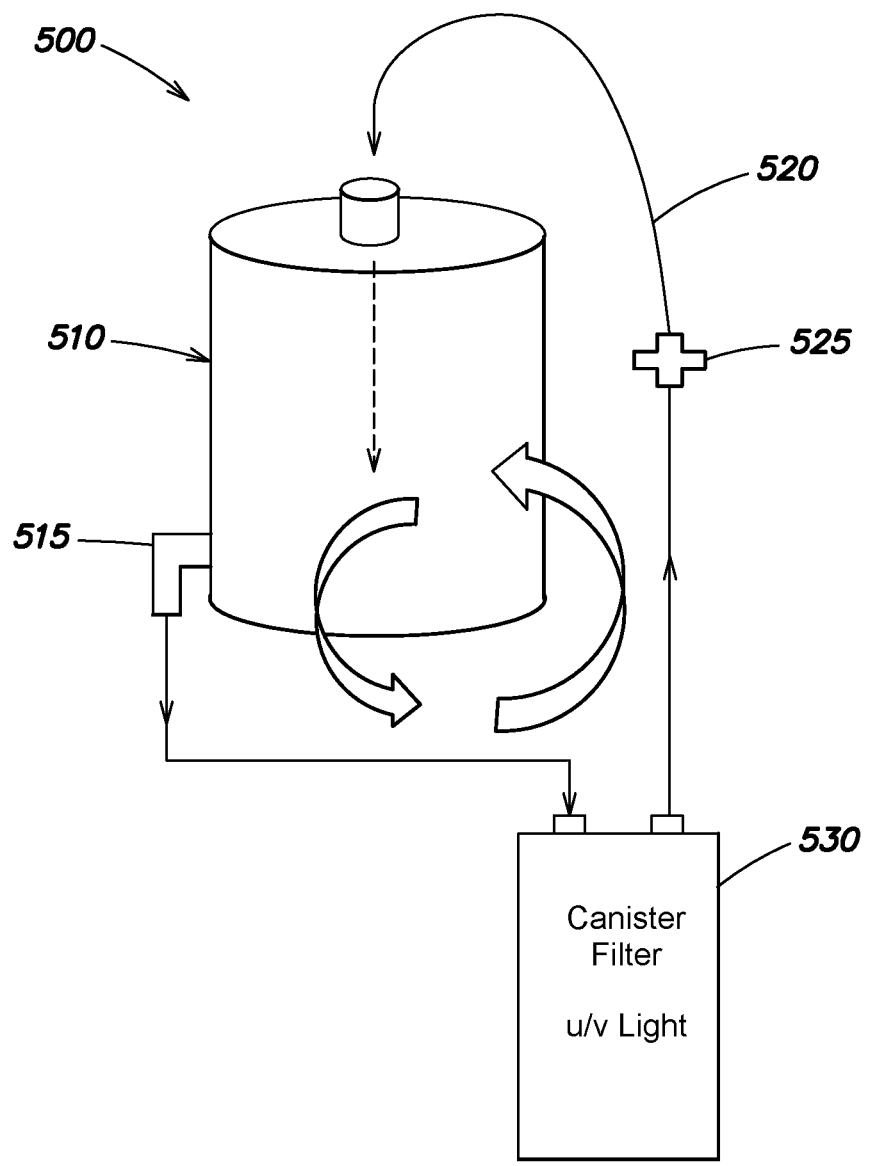
FIG. 5B is a schematic diagram of the recirculating water supply tank of FIG. 5A.

Recirculating water tanks may be used to supply clean sanitized water to all the modules in the incubation system. As illustrated in FIGS. 5A and 5B, a recirculating water tank 500 includes a bulk container 510, a valve 515, and a flexible hose 520 including a shutoff valve 525 used to circulate water from the bulk container 510 through a cannister filter 530 including a UV light source for disinfecting the water. Raw seawater may be mixed with manufactured sea water in in the bulk container 510 in a 2/3 to 1/3 ratio. Raw seawater can also be used 100%. When the flexible hose 520 is placed in the bulk container 510 and the valves 515, 525 turned on, the water in the bulk container 510 will circulate into the cannister filter 530 where mechanical filters remove solids and the UV light helps control bioburden. This creates a functional loop. To fill the modules, the valve 525 on the flexible hose 520 is turned off and the hose 520 removed from the bulk container 510. When the valve 525 is turned on water will flow freely from the hose 520.

The incubation process may be a continuous process throughout most of the year. Embodiments of the incubation system run independent of the weather, are easy to maintain and run, and can keep the developing horseshoe crabs alive for days in the event of a power outage.

In some embodiments each of the four modules are physically separated and operate independent of each other so if one fails it does not affect the others. The modules may be broken down for cleaning approximately every two weeks. Capacity of the system may be increased by adding new modules.

Figure 4:
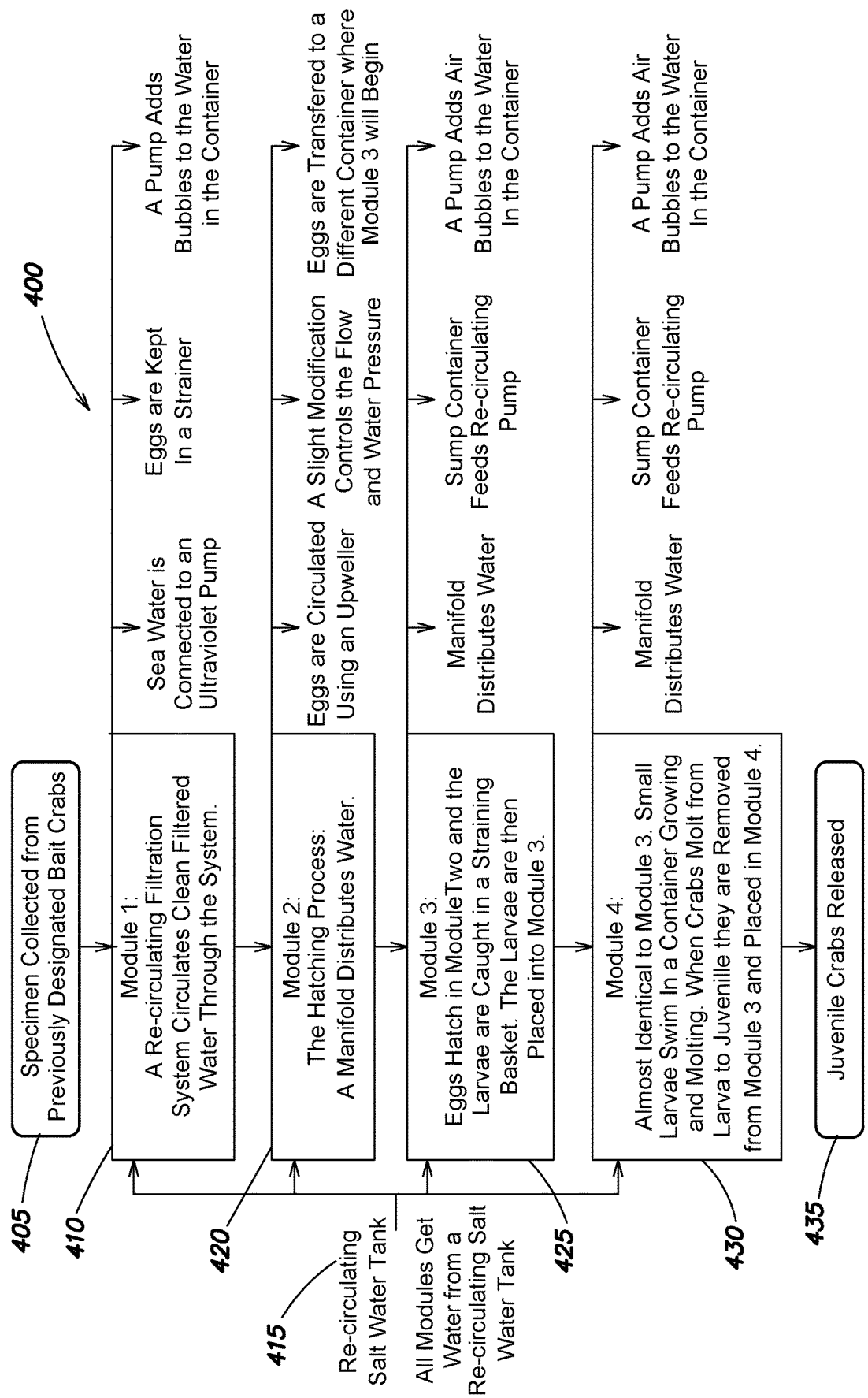
FIG. 4 is a flowchart of a method of incubating horseshoe crabs.

A flowchart of a method 400 of incubating horseshoe crabs is illustrated in FIG. 4. In act 405, samples of eggs and sperm are collected from live horseshoe crabs and combined. The eggs and sperm are placed into a strainer which may include a mesh bag or bags. The strainer is mounted in the incubation module (Module 1) in act 410 and a recirculating filtration system circulates clean filtered seawater through the system. The seawater may be provided to the incubation module, and to the other modules in the incubation system, from one or more re-circulating salt water tanks (act 415). In some embodiments, seawater is provided from the re-circulating salt water tank to each module in the incubation system separately so that if there is some sort of problem or contamination in one module, the other modules are not affected. Each life stage of the horseshoe crab offers different bioburden sources and contributions. By separating the modules to function as independent systems with their own water, it decreases the risk of losing all the growing crabs to foul water. In other embodiments, seawater may be provided from the re-circulating salt water tank to one or more, or to all of the modules in the incubation system in parallel or in series.

The seawater recirculated through the incubation module may be subjected to disinfection by exposure to ultraviolet light, for example, in a recirculation pump that includes an ultraviolet light source. The recirculation pump may be a canister pump that contains foam filters to remove solids and a UV light that helps kill bacteria. An air pump may be utilized to oxygenate the seawater in the incubation module by bubbling air through the seawater in the module.

After a period of incubation, viable eggs are transferred to a hatching module (Module 2) in act 420. In the hatching module, the eggs are held in a modified upweller. The upweller is modified to include a lid with an aperture that controls flow of circulating seawater through the upweller and water pressure within the upweller. The hatching module may include multiple upwellers. A manifold may distribute circulating seawater to the different upwellers. The seawater may be recirculated using a similar recirculation pump as used in the incubation module. The eggs hatch in the hatching module and the hatched larvae escape the upwellers through the apertures in the lids. The larvae that escape the upwellers are caught in a straining basket.

In act 425, the larvae caught in the straining basket are transferred to a larvae holding module (Module 3). The larvae holding module may include one or more trays. Filtered and disinfected seawater is distributed to the different trays with a manifold. The seawater flows out of the trays into a sump container that feeds a recirculating pump. The seawater may be recirculated using a similar recirculation pump as used in the incubation module. An air pump may be utilized to oxygenate the seawater in the sump container by bubbling air through the seawater in the sump container.

In the larvae holding module, the larvae molt into juveniles and are then transferred to a juvenile holding module (Module 4, act 430). The juvenile holding module may include one or more trays that may be similar to the trays of the larvae holding module. Filtered and disinfected seawater is distributed to the different trays with a manifold. The seawater flows out of the trays into a sump container that feeds a recirculating pump. The seawater may be recirculated using a similar recirculation pump as used in the incubation module. An air pump may be utilized to oxygenate the seawater in the sump container by bubbling air through the seawater in the sump container.

The juvenile crabs are allowed to grow for a period of time in the juvenile holding module and are then released to the ocean in areas where they can quickly find a calm, sandy bottom in which to burrow and hide from predators (act 435).

Although described with reference to horseshoe crabs, it is to be appreciated that systems and methods disclosed herein may also be utilized with other aquatic species.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure and are intended to be within the scope of the examples discussed herein. Accordingly, the foregoing description and drawings are by way of example only.

What is claimed is:

1. A system for incubating an aquatic species, the system comprising:

an incubation module including a vessel, a screened incubation container removably disposed in the vessel, and a water pump configured to circulate water through the incubation module;

a hatching module for receiving viable eggs from the incubation module and including an upweller and a water pump and manifold configured to circulate water through the hatching module, the upweller configured to retain fertilized eggs of the aquatic species and including a cylinder open only at an upper end thereof, a tube disposed within the cylinder and configured to direct water from the manifold downward into the cylinder, a cover configured to be disposed on the upper end of the cylinder and having an aperture that creates a back pressure in the upweller that helps larvae move upward and out of the upweller while keeping fertilized eggs from escaping the upweller, and a sump including a screen configured to capture larvae that exit the upweller, the upweller further including a spout configured to direct water and the larvae from the aperture into the sump;

a larvae holding module for receiving the larvae from the hatching module and including a water pump configured to circulate water through the larvae holding module; and a juvenile holding module for receiving juveniles from the larvae holding module and including a water pump configured to circulate water through the juvenile holding module.

2. The system of claim 1, wherein the larvae holding module includes at least one tray having a screened outlet.

3. The system of claim 1, wherein the juvenile holding module includes at least one tray having a screened outlet.

4. The system of claim 1, further comprising one or more ultraviolet light dosing chambers in which water circulated through a respective one or more of the incubation module, hatching module, larvae holding module, or juvenile holding module is treated with ultraviolet light.

5. The system of claim 1, further comprising one or more air pumps configured to deliver air to water circulated through a respective one or more of the incubation module, hatching module, larvae holding module, or juvenile holding module.

6. The system of claim 1, wherein each of the incubation module, hatching module, larvae holding module, and juvenile holding module has an associated dedicated re-circulating saltwater tank configured to provide saltwater to each respective module.

7. The system of claim 1, wherein the screened incubation container includes a mesh bag that allows for dead sperm and other material to be washed away from eggs in the mesh bag.

8. The system of claim 1, wherein the hatching module further comprises a pump configured to circulate water from the sump through the upweller.

9. A system for incubating an aquatic species, the system comprising a hatching module including:

one or more upwellers, each of the one or more upwellers configured to retain fertilized eggs of the aquatic species and including a cylinder open only at an upper end thereof, a cover configured to be disposed on the upper end of the cylinder and having an aperture configured to create a back pressure in seawater circulating through the one or more upwellers that helps larvae move upward and out of the upweller while keeping fertilized eggs from escaping the upweller;

a manifold configured to deliver seawater into each of the one or more upwellers, the one or more upwellers further including a tube disposed within the cylinder and configured to direct the seawater from the manifold downward into the cylinder;

a sump in fluid communication with the apertures in the covers of the one or more upwellers and configured to receive seawater and larvae exiting from the apertures in the covers of the one or more upwellers, the one or more upwellers further including a spout configured to direct water and the larvae from the aperture into the sump;

a straining screen disposed in the sump and configured to capture larvae that have exited from the apertures in the covers of the one or more upwellers;

a recirculating pump in fluid communication downstream of the sump and configured to pump seawater from the sump to the manifold; and a filter and ultraviolet light disinfection system disposed in a fluid flow path of the seawater.

10. The system of claim 9, wherein the filter and ultraviolet light disinfection system are included in the recirculating pump.

11. The system of claim 9, further comprising a dedicated re-circulating saltwater tank configured to provide saltwater to the hatching module.

12. The system of claim 11, wherein the dedicated re-circulating saltwater tank is fluidly coupled to a filter and ultraviolet light disinfection system configured to treat saltwater from the saltwater tank and return the treated saltwater to the saltwater tank.

13. The system of claim 9, wherein the hatching module is configured to perform a process comprising:

moving the fertilized eggs within the one or more upwellers by circulating seawater through the one or more upwellers from the manifold into the sump;

disinfecting and oxygenating the seawater circulated through the one or more upwellers;

maintaining a backpressure of the circulating seawater in the one or more upwellers; and capturing larvae that hatch from the fertilized eggs and swim out of the one of more upwellers.

14. A system for incubating an aquatic species, the system comprising a larvae holding module including:

a plurality of trays configured to retain larvae of the aquatic species, each of the plurality of trays including a screened outlet having a screen size sufficiently small to prevent the larvae from passing through the screened outlet;

a distribution manifold configured to supply seawater to first ends of each of the plurality of trays, the screened outlet of each of the plurality of trays being disposed only on second ends of the plurality of trays opposite the first ends;

a sump positioned downstream of the plurality of trays and configured to receive seawater draining from the plurality of trays through the screened outlets, the plurality of trays being arranged fluidically in series between the distribution manifold and the sump;

a supply of oxygen-containing gas including an air bubbler disposed in a bottom of the sump and configured to deliver oxygen to seawater in the sump;

a recirculating pump in fluid communication downstream of the sump configured to pump seawater from the sump to the distribution manifold; and a filter and ultraviolet light disinfection system disposed in a fluid flow path of the seawater.

15. The system of claim 14, wherein the filter and ultraviolet light disinfection system are included in the recirculating pump.

16. The system of claim 14, further comprising a dedicated re-circulating saltwater tank configured to provide saltwater to the larvae holding module and to a juvenile holding module.

17. The system of claim 16, wherein the dedicated re-circulating saltwater tank is fluidly coupled to a filter and ultraviolet light disinfection system configured to treat saltwater from the saltwater tank and return the treated saltwater to the saltwater tank.

18. The system of claim 16, wherein the plurality of trays include a plurality of trays fluidically coupled in parallel.

19. The system of claim 16, wherein the one or more trays are in fluid communication upstream of a juvenile holding module.

20. The system of claim 19, wherein the larvae holding module and the juvenile holding module share the sump, the supply of oxygen-containing gas, and the recirculating pump.

21. The system of claim 16, configured to perform a process comprising:
   retaining the larvae in the one or more trays until the larvae molt;
   circulating seawater through the one or more trays; and
   filtering and disinfecting the seawater circulated through the one or more trays.

22. A system for incubating an aquatic species, the system comprising a juvenile holding module including:
   a plurality of trays configured to retain juveniles of the aquatic species, each of the plurality of trays including a screened outlet having a screen size sufficiently small to prevent the juveniles from passing through the screened outlet;
   a distribution manifold configured to supply seawater to first ends of each of the plurality of trays, the screened outlet of each of the plurality of trays being disposed only on second ends of the plurality of trays opposite the first ends;
   a sump positioned downstream of the plurality of trays and configured to receive seawater draining from the plurality of trays through the screened outlets, the plurality of trays being arranged fluidically in series between the distribution manifold and the sump;
   a supply of oxygen-containing gas including an air bubbler disposed in a bottom of the sump and configured to deliver oxygen to seawater in the sump;
   a recirculating pump in fluid communication downstream of the sump configured to pump seawater from the sump to the distribution manifold; and
   a filter and ultraviolet light disinfection system disposed in a fluid flow path of the seawater.

23. The system of claim 22, wherein the filter and ultraviolet light disinfection system are included in the recirculating pump.

24. The system of claim 22, further comprising a dedicated re-circulating saltwater tank configured to provide saltwater to the juvenile holding module and to a larvae holding module.

25. The system of claim 24, wherein the dedicated re-circulating saltwater tank is fluidly coupled to a filter and ultraviolet light disinfection system configured to treat saltwater from the saltwater tank and return the treated saltwater to the saltwater tank.

26. The system of claim 24, wherein the plurality of trays include a plurality of trays fluidically coupled in parallel.

27. The system of claim 24, wherein the one or more trays are in fluid communication downstream of the larvae holding module.

28. The system of claim 27, wherein the larvae holding module and the juvenile holding module share the sump, the supply of oxygen-containing gas, and the recirculating pump.

29. The system of claim 24, configured to perform a process comprising:
   retaining the juveniles in the one or more trays until the juveniles grow to a predetermined size;
   circulating seawater through the one or more trays; and
   filtering and disinfecting the seawater circulated through the one or more trays.

\* \* \* \* \*